(12) United States Patent
Mori (10) Patent No.: US 12,243,684 B2
(45) Date of Patent: Mar. 4, 2025

(54) ACTUATOR

(71) Applicant: NIDEC INSTRUMENTS CORPORATION, Nagano (JP)

(72) Inventor: Akira Mori, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 147 days.

(21) Appl. No.: 18/037,771

(22) PCT Filed: Nov. 16, 2021

(86) PCT No.: PCT/JP2021/042039
§ 371 (c)(1),
(2) Date: May 19, 2023

(87) PCT Pub. No.: WO2022/113819
PCT Pub. Date: Jun. 2, 2022

(65) Prior Publication Data
US 2024/0006108 A1    Jan. 4, 2024

(30) Foreign Application Priority Data
Nov. 25, 2020  (JP) .................................. 2020-194855

(51) Int. Cl.
*H01F 7/16*      (2006.01)
*H01F 7/08*      (2006.01)
*H01F 7/126*     (2006.01)

(52) U.S. Cl.
CPC ........... *H01F 7/1607* (2013.01); *H01F 7/081* (2013.01); *H01F 7/126* (2013.01)

(58) Field of Classification Search
CPC .............................. H01F 7/126; H01F 7/1607
(Continued)

(56) References Cited

U.S. PATENT DOCUMENTS 4,422,060 A * 12/1983 Matsumoto ............... H01F 7/13
  335/266
6,853,100 B2 * 2/2005 Yumita ................... H01F 7/081
  310/12.24

(Continued)

FOREIGN PATENT DOCUMENTS

EP        3597314       1/2020
JP        2003220363    8/2003
(Continued)

OTHER PUBLICATIONS

"International Search Report (Form PCT/ISA/210) of PCT/JP2021/042039", mailed on Feb. 15, 2022, with English translation thereof, pp. 1-4.

*Primary Examiner* — Alexander Talpalatski
(74) *Attorney, Agent, or Firm* — JCIPRNET (57) ABSTRACT

An actuator causes vibration of a movable body by a magnetic drive mechanism. The movable body includes: a support shaft having an outer circumferential surface fixed with a magnet; a cup-shaped first magnetic member fixed to an end surface of the magnet in an axial direction; and a second magnetic member fixed to an opposite side of an end plate of the first magnetic member from the side of the magnet. A weight adjustment section in the second magnetic member is a through hole. An outer shape of the second magnetic member is not reduced in size. A bent section of the first magnetic member overlaps an outer circumferential end of the second magnetic member. The weight adjustment section is provided on an inner circumferential side of an outer circumferential surface of the magnet. A magnetic member deficient portion is provided to avoid a portion with high magnetic flux density.

5 Claims, 7 Drawing Sheets

(58) Field of Classification Search
USPC .................................. 335/279, 205, 229, 234
See application file for complete search history.

(56) References Cited

U.S. PATENT DOCUMENTS

| | | |
|---|---|---|
| 7,023,112 B2 | 4/2006 | Miyamoto et al. |
| 8,957,749 B2* | 2/2015 | Matsumoto ........... H01F 7/1607 |
| | | 335/282 |
| 11,271,465 B2 | 3/2022 | Kitahara et al. |
| 2004/0090295 A1* | 5/2004 | Yajima ................... F16F 15/03 |
| | | 335/229 |
| 2011/0248805 A1* | 10/2011 | Hamaoka .............. F16K 27/029 |
| | | 335/278 |

FOREIGN PATENT DOCUMENTS

| | | |
|---|---|---|
| JP | 2012213710 | 11/2012 |
| JP | 2019013086 | 1/2019 |
| JP | 2019209315 | 12/2019 |

* cited by examiner

FIG. 7

ACTUATOR

CROSS-REFERENCE TO RELATED APPLICATION

This application is a 371 application of the International PCT application serial no. PCT/JP2021/042039, filed on Nov. 16, 2021, which claims the priority benefits of Japan Patent Application No. 2020-194855, filed on Nov. 25, 2020. The entirety of each of the above-mentioned patent applications is hereby incorporated by reference herein and made a part of this specification.

TECHNICAL FIELD

The present invention relates to an actuator that causes a movable body to move relative to a support body.

BACKGROUND ART

A configuration of the following actuator has been proposed. The actuator includes: a connection body connected to a movable body and a support body; and a magnetic drive mechanism that causes the movable body to move relative to the support body. In Patent Literature 1, an actuator that uses a gel-like member as the connection body is disclosed. In the actuator disclosed in Patent Literature 1, the movable body includes a magnet and a yoke to which the magnet is fixed. The support body includes a coil that opposes the magnet.

CITATION LIST

Patent Literature

[Patent Literature 1] Japanese Unexamined Patent Application Publication No. 2019-13086

SUMMARY OF THE INVENTION

Problems to be Solved by the Invention

In the actuator that includes the magnetic drive mechanism, a vibration characteristic of the movable body is defined by thrust (magnetic drive power) that is generated in a magnetic circuit including a coil, a magnet, and a yoke, weight of the movable body, and a spring constant of the gel-like member as the connection body.

The present inventors have proposed an actuator in which a movable body is accommodated in a cylindrical case and which causes the movable body to vibrate in an axial direction. The movable body includes: a support shaft that extends in the axial direction; and a magnet and a yoke that are fixed to the support shaft. Both ends of the movable body in the axial direction are connected to the case via a cylindrical gel-like member that surrounds an outer circumferential side of the support shaft. The yoke includes a cup-shaped first magnetic member. The first magnetic member includes: a circular end plate that is fixed to an end surface of the magnet; and a cylindrical section that surrounds an outer circumferential side of the magnet. In addition, in order for the yoke to have a movable body weight adjustment function, a disc-shaped second magnetic member is fixed to an opposite side of the first magnetic member from the side of the magnet.

Such a configuration has the following problem. In the case where a shape of the second magnetic member is changed for weight adjustment, the second magnetic member can no longer be arranged at a position with high magnetic flux density, and magnetic efficiency is consequently degraded. For example, the cup-shaped first magnetic member has the high magnetic flux density, and an outer circumferential end of the end plate that abuts the magnet is bent. In the case where the outer shape of the second magnetic member is reduced in size for weight reduction of the movable body, an outer circumferential end of the second magnetic member does not reach a portion (the bent portion) with the high magnetic flux density. As a result, a magnetic path is narrowed, and magnetic resistance is increased. This produces a problem that a magnitude of the thrust (the magnetic drive power) applied to the movable body is reduced, which disables output of strong vibrations.

The present invention has been made in view of the above problems and therefore has a purpose of suppressing degradation of magnetic efficiency, which is caused by weight adjustment of a movable body, in an actuator in which the movable body vibrates with respect to a support body.

Means for Solving the Problem

In order to solve the above problem, an actuator according to the present invention includes: a support body and a movable body; a connection body connected to the support body and the movable body; and a magnetic drive mechanism that includes a magnet and a coil and causes the movable body to move relative to the support body. The movable body includes: a support shaft having an outer circumferential surface, to which the magnet is fixed; and a yoke that is fixed to an end surface of the magnet in an axial direction. The yoke includes: a first magnetic member that includes an end plate fixed to the end surface, a bent section provided at an outer edge of the end plate, and a cylindrical section extending from the bent section to the magnet side; and a second magnetic member that is fixed to an opposite side of the end plate from the side of the magnet. The second magnetic member includes a weight adjustment section, which is deficient either partially or entirely in a thickness direction. When seen in the axial direction, the weight adjustment section is provided on an inner circumferential side of an outer circumferential surface of the magnet.

In the present invention, the movable body includes the first magnetic member and the second magnetic member, and the second magnetic member includes the weight adjustment section, which is deficient either partially or entirely in a thickness direction. Accordingly, weight of the second magnetic member can be changed without changing an outer shape of the second magnetic member. Consequently, a magnetic path, which is formed at a position in the bent section of the first magnetic member, is less likely to be narrowed. In addition, magnetic flux density of the first magnetic member is high in a portion that overlaps an outer circumferential surface of the magnet when seen in the axial direction. The weight adjustment section adjusts weight by lacking a portion of the magnetic member on an inner circumferential side of the portion with the high magnetic flux density. Thus, the magnetic path is less likely to be narrowed. Therefore, it is possible to suppress an increase in magnetic resistance, which is caused by formation of the weight adjustment section, and to suppress degradation of magnetic efficiency, which is caused by weight adjustment of the movable body.

In the present invention, the weight adjustment section is preferably a through-hole or a half-punched section. In this way, the weight adjustment section can easily be formed for the plate-shaped second magnetic member. In addition, since the number and a size of the weight adjustment section can easily be changed, the weight of the second magnetic member can easily be changed.

In the present invention, the weight adjustment sections are preferably arranged evenly in a circumferential direction with a center of gravity of the movable body being a center. In this way, it is possible to prevent shifting of a center of gravity of the movable body, which is caused by provision of the weight adjustment section.

In the present invention, when seen in the axial direction, an outer circumferential end of the second magnetic member extends to a position at which the outer circumferential end overlaps the bent section. The bent section has the high magnetic flux density. Thus, as long as the outer circumferential end of the second magnetic member reaches the bent section, the magnetic path is less likely to be narrowed. Therefore, it is possible to suppress the increase in the magnetic resistance and to suppress the degradation of the magnetic efficiency, which is caused by the weight adjustment of the movable body.

In the present invention, when seen in the axial direction, an outer circumferential end surface of the second magnetic member is preferably located at the same position as an outer circumferential surface of the cylindrical section or on a more outer circumferential side than the outer circumferential surface of the cylindrical section. In this way, an entire range of the bent section overlaps the second magnetic member in the axial direction. As a result, the magnetic path is not narrowed. Therefore, it is possible to suppress the increase in the magnetic resistance and to suppress the degradation of the magnetic efficiency, which is caused by the weight adjustment of the movable body.

Effect of the Invention

According to the present invention, the movable body includes the first magnetic member and the second magnetic member, and the second magnetic member includes the weight adjustment section, which is deficient either partially or entirely in a thickness direction. Accordingly, weight of the second magnetic member can be changed without changing an outer shape of the second magnetic member. Consequently, a magnetic path, which is formed at a position in the bent section of the first magnetic member, is less likely to be narrowed. In addition, the magnetic flux density of the first magnetic member is high in the portion that overlaps the outer circumferential surface of the magnet when seen in the axial direction. The weight adjustment section adjusts weight by lacking the portion of the magnetic member on the inner circumferential side of the portion with the high magnetic flux density. Thus, the magnetic path is less likely to be narrowed. Therefore, it is possible to suppress the increase in the magnetic resistance, which is caused by formation of the weight adjustment section, and to suppress the degradation of the magnetic efficiency, which is caused by the weight adjustment of the movable body.

MODE FOR CARRYING OUT THE INVENTION

Overall Configuration

Figure 1:
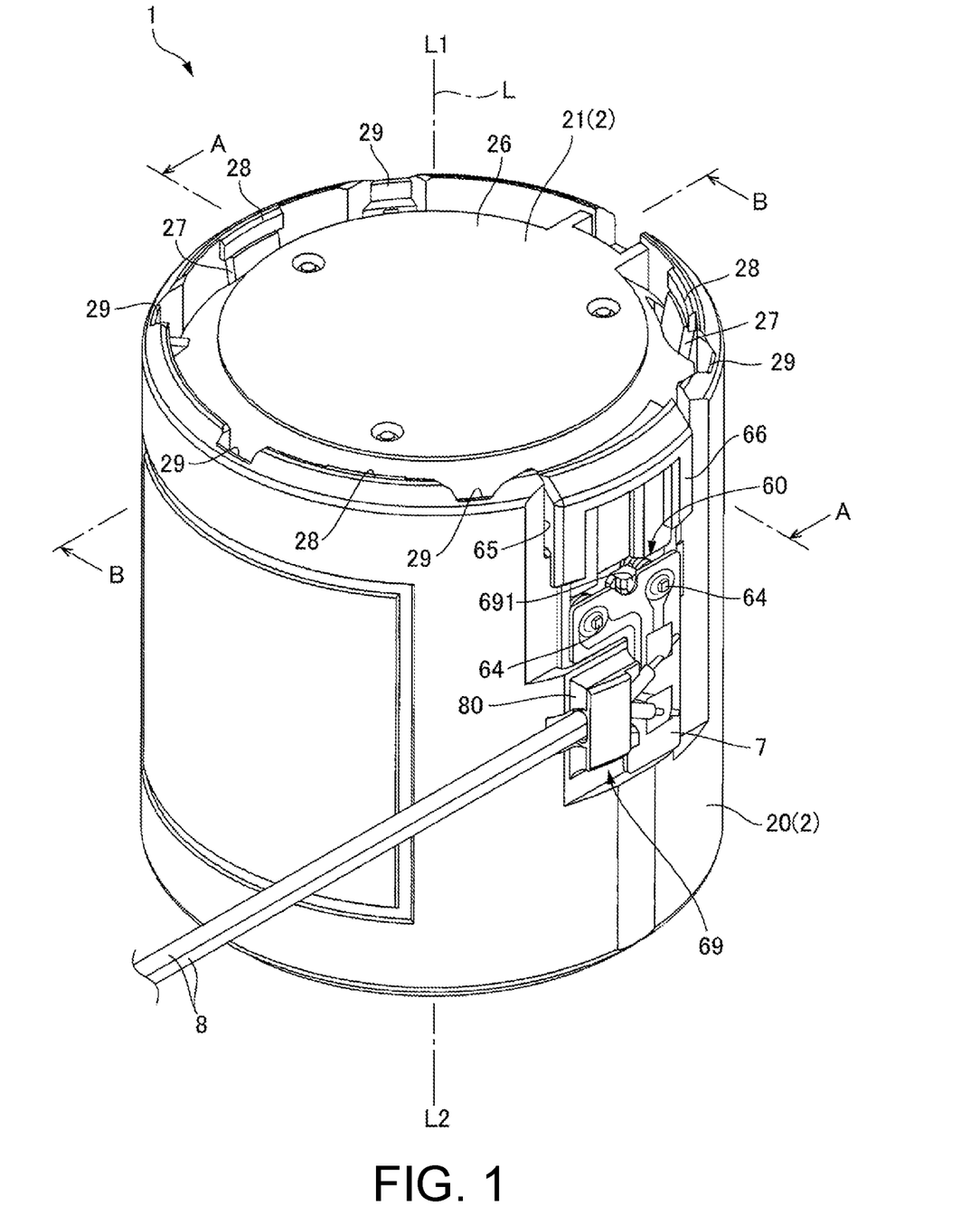
FIG. 1 is a perspective view of an actuator according to an embodiment of the present invention.
Figure 2:
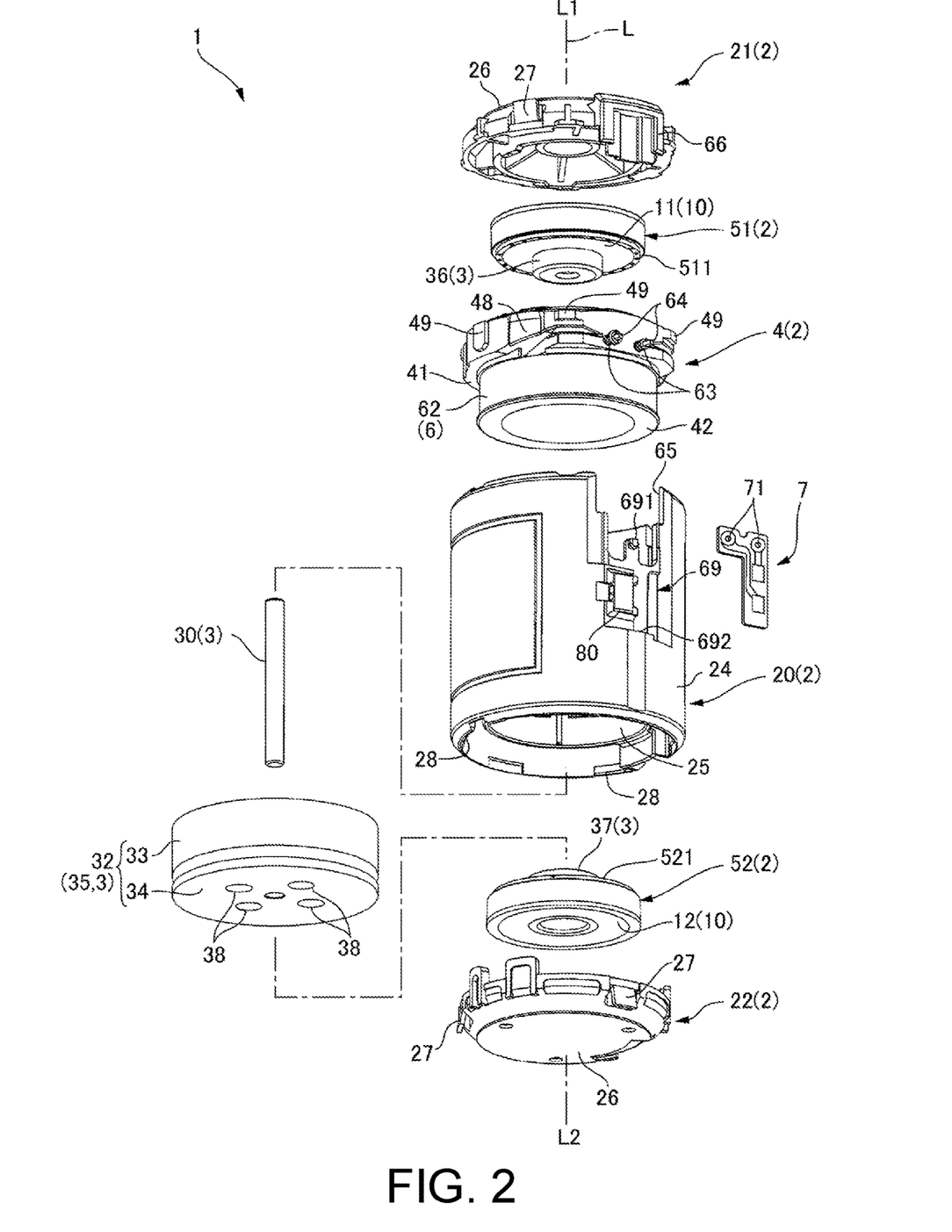
FIG. 2 is an exploded perspective view of the actuator illustrated in FIG. 1.
Figure 3:
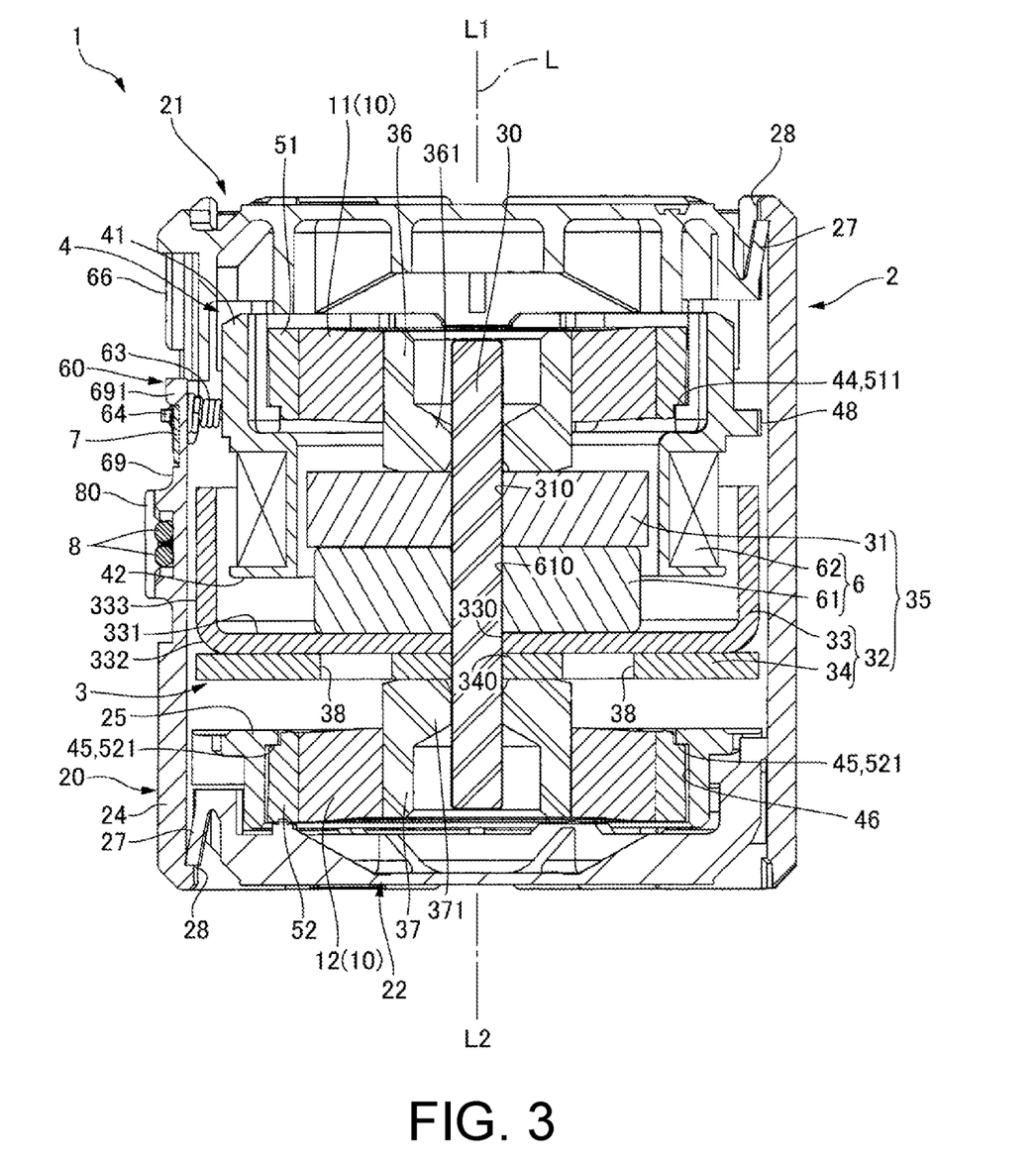
FIG. 3 is a cross-sectional view of the actuator illustrated in FIG. 1 (a cross-sectional view that is taken along A-A in FIG. 1).
Figure 4:
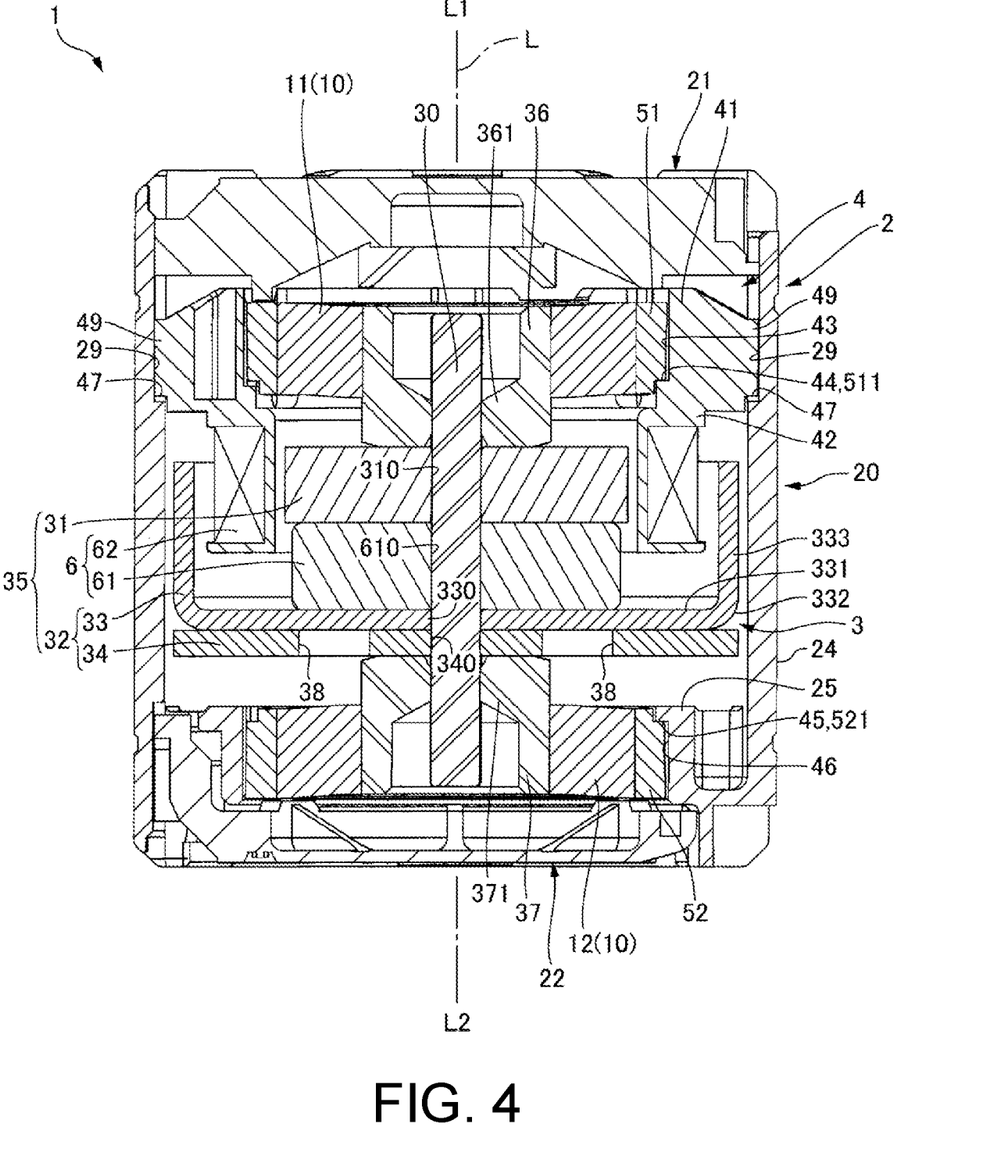
FIG. 4 is a cross-sectional view of the actuator illustrated in FIG. 1 (a cross-sectional view that is taken along B-B in FIG. 1).

A description will hereinafter be made on an embodiment of the present invention with reference to the drawings. FIG. 1 is a perspective view of an actuator 1 according to the embodiment of the present invention. FIG. 2 is an exploded perspective view of the actuator 1 illustrated in FIG. 1. FIGS. 3 and 4 are cross-sectional views of the actuator 1 illustrated in FIG. 1. FIG. 3 is a cross-sectional view that is taken along a position A-A in FIG. 1. FIG. 4 is a cross-sectional view that is taken along a position B-B in FIG. 1, and is a cross-sectional view that is taken in a direction orthogonal to FIG. 3. In the following description, a direction in which a center axis L of a movable body 3 extends is set as an axial direction, one side of the axial direction is set as L1, and the other side of the axial direction is set as L2.

As illustrated in FIG. 1 to FIG. 4, the actuator 1 includes a support body 2, the movable body 3, a connection body 10 connected to the support body 2 and the movable body 3, and a magnetic drive mechanism 6 that causes the movable body 3 to move relative to the support body 2. The connection body 10 is at least either magnetic or viscoelastic. The magnetic drive mechanism 6 includes: a magnet 61 arranged on the movable body 3; and a coil 62 arranged in the support body 2, and causes the movable body 3 to move relative to the support body 2 in the axial direction. As illustrated in FIGS. 3 and 4, at a position of each of an end on the one side L1 of the movable body 3 in the axial direction and an end on the other side L2 of the movable body 3 in the axial direction, the movable body 3 is connected to the support body 2 via the connection body 10.

Support Body

As illustrated in FIG. 2 to FIG. 4, the support body 2 has: a cylindrical case 20; a first lid member 21 that closes an opening on the one side L1 of the case 20 in the axial direction; a second lid member 22 that closes an opening on the other side L2 of the case 20 in the axial direction; and a coil holder 4 arranged between the first lid member 21 and the second lid member 22 on an inner circumferential side of the case 20. In the present embodiment, the case 20, the first lid member 21, the second lid member 22, and the coil holder 4 are made of resin. The support body 2 also has: a first outer frame member 51 that is fitted to an inner circumferential side of the coil holder 4; and a second outer frame member 52 that is provided at a position separating from the first outer frame member 51 to the other side L2 in the axial direction and is fitted to the inner circumferential side of the case 20.

Connection Body

The connection body 10 includes: an annular first connection body 11 that is joined to an inner circumferential surface of the first outer frame member 51; and an annular second connection body 12 that is joined to an inner circumferential surface of the second outer frame member 52. In the present embodiment, as will be described below, each of the first connection body 11 and the second connection body 12 is a gel-like member that is formed by molding a gel material, and is joined to respective one of the first outer frame member 51 and the second outer frame member 52 by viscosity of the gel-like member itself.

Coil Holder

As illustrated in FIG. 2, the coil holder 4 includes an annular first outer frame member fixture section 41 and a trunk 42 that is projected to the outer side L2 in the axial direction from the first outer frame member fixture section 41. The coil 62 is arranged around the trunk 42. Ends of a coil wire 63 drawn from the coil 62 are entwined with two terminal pins 64, each of which is projected radially outward from the first outer frame member fixture section 41 of the coil holder 4. As illustrated in FIG. 1, each of the terminal pins 64 is projected to the outside of the case 20 and is connected to a wiring board 7.

As illustrated in FIG. 4, the coil holder 4 includes a first step 44 that positions the first outer frame member 51 in the axial direction. The first outer frame member fixture section 41 surrounds an outer circumferential side of the first outer frame member 51. A first concave section 43, which is recessed to the other side L2 in the axial direction, is provided in an inner circumferential surface of the first outer frame member fixture section 41. The first outer frame member 51 is press-fitted into the first concave section 43. The first step 44 is provided at an end on the other side L2 of the first concave section 43 in the axial direction. In the present embodiment, an annular step 511 formed on an outer circumferential surface of the first outer frame member 51 abuts the first step 44 in the axial direction.

Case

The case 20 includes a cylindrical case body 24 and a second outer frame member fixture section 25 arranged on an inner circumferential side of the case body 24. The second outer frame member fixture section 25 is arranged at a position that separates from the coil holder 4 to the other side L2 in the axial direction. As illustrated in FIGS. 2 and 4, the second outer frame member fixture section 25 is projected to the inner circumferential side from an inner circumferential surface of the case body 24 and is integrally molded with the case body 24.

The case 20 includes a second step 45 that positions the second outer frame member 52 in the axial direction. As illustrated in FIGS. 3 and 4, a second concave section 46, which is recessed to the other side L1 in the axial direction, is provided in an inner circumferential surface of the second outer frame member fixture section 25, and the second outer frame member 52 is press-fitted into the second concave section 46. The second step 45 is provided at an end on the other side L1 of the second concave section 46 in the axial direction. In the present embodiment, an annular step 521 formed on an outer circumferential surface of the second outer frame member 52 abuts the second step 45 in the axial direction.

The case 20 further includes a third step 47 that positions the coil holder 4 in the axial direction. As illustrated in FIG. 4, the third step 47 is formed on the inner circumferential surface of the case body 24. As illustrated in FIGS. 1 and 4, plural grooves 29, each of which extends in the axial direction, are formed on the inner circumferential surface of the case body 24, to which the coil holder 4 is fitted. The third step 47 is formed at an end on the other side L2 of each of the grooves 29 in the axial direction. As illustrated in FIG. 2, the coil holder 4 includes plural convex sections 49, each of which is projected from an outer circumferential surface of the first outer frame member fixture section 41. When the support body 2 is assembled, each of the convex sections 49 of the coil holder 4 is fitted to the respective groove 29 of the case body 24 from the one side L1 in the axial direction and abuts the respective third step 47 in the axial direction. In this way, the coil holder 4 is press-fitted and fixed to the case body 24 and is positioned in the axial direction.

Lid Member

As illustrated in FIGS. 3 and 4, the first lid member 21 is fixed to the case body 24 from the one side L1 of the first outer frame member fixture section 41, which is provided in the coil holder 4, in the axial direction. The second lid member 22 is fixed to the case body 24 from the other side L2 of the second outer frame member fixture section 25 in the axial direction. As illustrated in FIG. 2, each of the first lid member 21 and the second lid member 22 includes: a lid 26 that has a circular shape when seen in the axial direction; and plural locking sections 27 that are arranged at an outer circumferential edge of the lid 26 at equally-spaced intervals in a circumferential direction. In the present embodiment, each of the first lid member 21 and the second lid member 22 includes the locking sections 27 at three positions. The locking section 27 is a claw that extends from the lid 26 in a manner to be tilted in a direction expanding to an outer circumferential side.

The locking section 27 is elastically deformed in a radial direction and, together with the lid 26, pressed into the inner circumferential side of the case body 24. The case 20 includes a restriction section 28 that restricts the locking section 27 from being unlocked from the inner side of the case 20. The restriction section 28 is a convex section that is projected to the inner circumferential side from an end of the case body 24. As illustrated in FIGS. 1 and 2, at the end on each of the one side L1 and the other side L2 of the case body 24 in the axial direction, the restriction sections 28 are arranged at three positions at equally-spaced intervals. The restriction section 28 abuts a tip of the locking section 27 in the axial direction. The first lid member 21 and the second lid member 22 are each fixed to the case 20 by concurrently using a locking structure with the locking section 27 and the restriction section 28 and fixture with an adhesive.

As illustrated in FIG. 2, the first outer frame member fixture section 41 of the coil holder 4 includes a groove 48 that is formed by notching a portion to the inner circumferential side. The portion overlaps the restriction section 28, which is provided in the case body 24, at respective one of the three positions in the axial direction. Accordingly, when the coil holder 4 is inserted in the case body 24, interference between the first outer frame member fixture section 41 and the restriction section 28 is avoided.

Wiring Draw-Out Section

As illustrated in FIGS. 1 and 3, the support body 2 includes a wiring draw-out section 60 for drawing out the terminal pin 64, with which the coil wire 63 drawn out from the coil 62 of the magnetic drive mechanism 6 is entwined.

The wiring draw-out section 60 is a clearance that is provided between a notch 65 (see FIG. 2) and a cover 66. The notch 65 is formed by notching an edge on the one side L1 of the case 20 in the axial direction to the other side L2 in the axial direction. The cover 66 extends from a circumferential part of the outer circumferential edge of the first lid member 21 toward the other side L2 in the axial direction.

The case 20 includes a board fixture section 69 that is formed on the other side L2 of the notch 65. The wiring board 7 is fixed to the board fixture section 69 by concurrently using fixture with the adhesive and a locking structure with a claw 691 and a locking groove 692. The claw 691 is provided at an end on the one side L1 of the board fixture section 69 in the axial direction, and the locking groove 692 is provided at an end on the other side L2 of the board fixture section 69 in the axial direction. A lead wire 8 for supplying power to the coil 62 is connected to the wiring board 7. The board fixture section 69 is provided with a lead wire holding section 80 that holds the lead wire 8 at a position adjacent to the wiring board 7 in the circumferential direction.

The first outer frame member fixture section 41 of the coil holder 4 is arranged on the inner circumferential side of the notch 65.

The coil wire 63, which is drawn out from the coil 62, is entwined with a root of respective one of the two terminal pins 64, each of which extends from the first outer frame member fixture section 41 toward the outer circumferential side. The terminal pins 64 penetrate two holes 71 (see FIG. 2) that are provided in the wiring board 7 fixed to the board fixture section 69, and are electrically connected to lands provided at edges of the holes 71.

Movable Body

As illustrated in FIGS. 2 to 4, the movable body 3 has a support shaft 30 that extends in the axial direction at a center of the support body 2 in the radial direction. The magnet 61 and a yoke 35 are fixed to the support shaft 30 by a first cylindrical inner frame member 36 and a second cylindrical inner frame member 37. The support shaft 30 is a round rod that is made of metal. Each of the first inner frame member 36 and the second inner frame member 37 is a cylindrical metallic body and is provided with a circular through hole.

As illustrated in FIGS. 3 and 4, in an inner circumferential surface of the first inner frame member 36, an annular projected section 361 that is projected radially inward is formed at an end on the other side L2 in the axial direction. Accordingly, when the first inner frame member 36 is press-fitted into the support shaft 30, the support shaft 30 is press-fitted into the annular projected section 361. Meanwhile, in an inner circumferential surface of the second inner frame member 37, an annular projected section 371 that is projected radially inward is formed at an end on the one side L1 in the axial direction. Accordingly, when the second inner frame member 37 is press-fitted into the support shaft 30, the support shaft 30 is press-fitted into the annular projected section 371.

Figure 5:
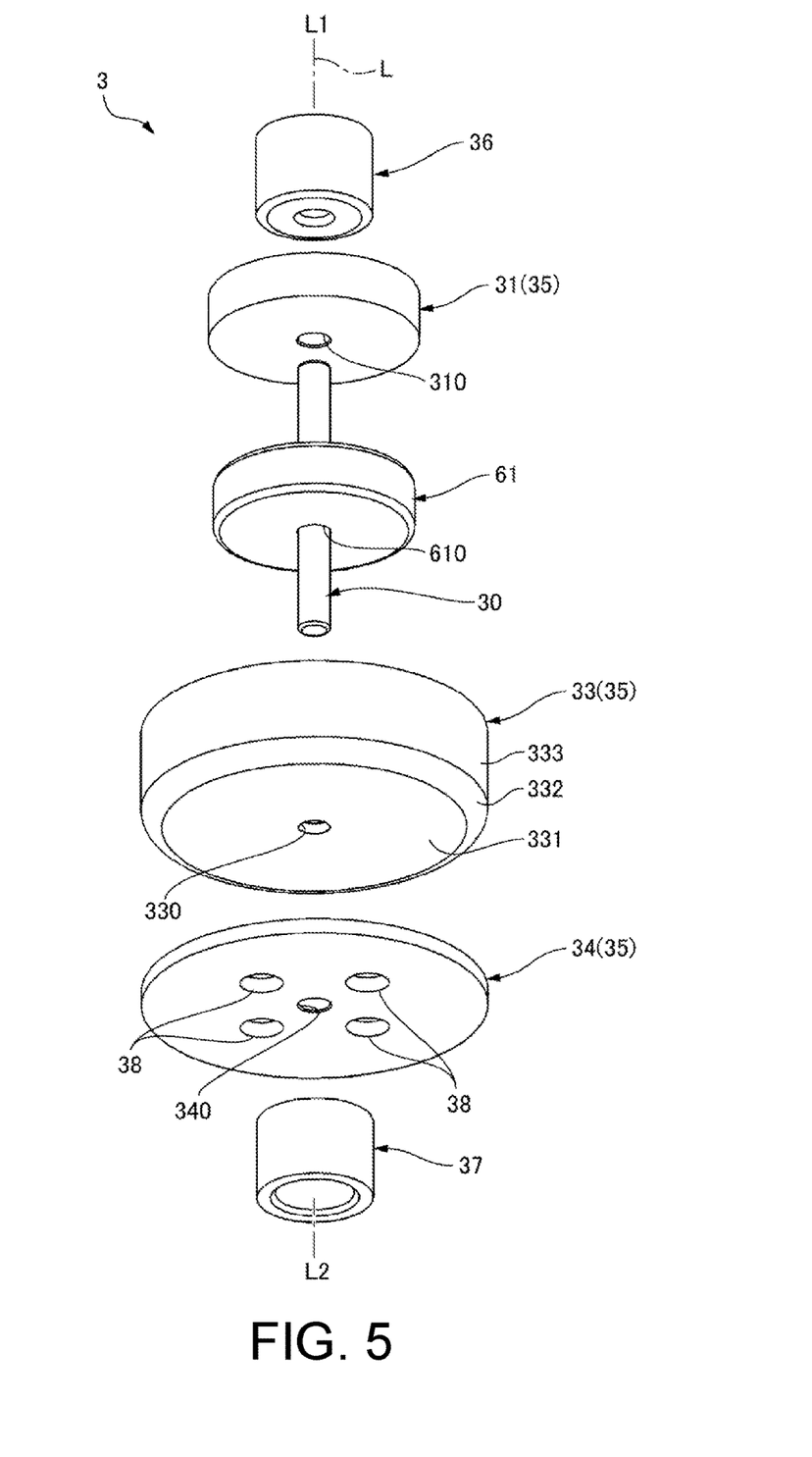
FIG. 5 is an exploded perspective view of a movable body.

FIG. 5 is an exploded perspective view of the movable body 3. As illustrated in FIG. 3 to FIG. 5, the magnet 61 is provided with a shaft hole 610, through which the support shaft 30 passes, and is fixed at a substantial center of the support shaft 30 in the axial direction.

The yoke 35 includes: a first yoke 31 that overlaps the magnet 61 on the one side L1 in the axial direction; and a second yoke 32 that overlaps the magnet 61 on the other side L2 in the axial direction.

A first yoke 31 is provided with a shaft hole 310 through which the support shaft 30 passes. In the present embodiment, the first yoke 31 is a magnetic plate, an outer diameter dimension of which is slightly larger than an outer diameter dimension of the magnet 61. An outer circumferential surface of the first yoke 31 bulges radially outward in comparison with an outer circumferential surface of the magnet 61. The first yoke 31 is fixed to a surface on the one side L1 of the magnet 61 by a method such as the adhesion.

The second yoke 32 includes two members, that is, a first cup-shaped magnetic member 33 and a second disc-shaped magnetic member 34. The first magnetic member 33 has: a circular end plate 331 that is provided with a shaft hole 330, through which the support shaft 30 passes; a bent section 332 that is bent from an outer edge of the end plate 331 toward the one side L1 in the axial direction; and a cylindrical section 333 that extends from the bent section 332 toward the one side L1 in the axial direction. In the present embodiment, the end plate 331 of the first magnetic member 33 is fixed to an end surface on the other side L2 of the magnet 61 in the axial direction. The second magnetic member 34 includes a shaft hole 340, through which the support shaft 30 passes, and is fixed to the magnet 61 from an opposite side of the end plate 331 of the first magnetic member 33 from the side of the magnet 61.

In the movable body 3, while the support shaft 30 passes through the shaft holes 310, 610, 330, 340 of the members constituting the magnet 61 and the yoke 35, the first inner frame member 36 and the second inner frame member 37 are fixed to the support shaft 30 on both sides of a pair of the magnet 61 and the yoke 35 in the axial direction. As a result, the first inner frame member 36 supports the magnet 61 and the yoke 35 from the one side L1 in the axial direction, and the second inner frame member 37 supports the magnet 61 and the yoke 35 from the other side L2 in the axial direction. In this way, the magnet 61 and the yoke 35 are fixed to the support shaft 30.

In the second yoke 32, an inner diameter of the cylindrical section 333 of the first magnetic member 33 is larger than the outer diameters of the magnet 61 and the first yoke 31. Accordingly, when the magnet 61 and the first yoke 31 are stacked on the circular end plate 331, which is a bottom of the cylindrical section 333, the cylindrical section 333 opposes the outer circumferential surface of the magnet 61 and the outer circumferential surface of the first yoke 31 at a position that is separated radially outward from the outer circumferential surface of the magnet 61 and the outer circumferential surface of the first yoke 31. The coil holder 4 includes the cylindrical trunk 42 that surrounds the outer circumferential side of the magnet 61 and the first yoke 31, and the coil 62 is wound around the trunk 42. Accordingly, the coil 62 is partially arranged between the cylindrical section 333 and the outer circumferential surface of the magnet 61. In addition, the coil 62 is partially arranged between the cylindrical section 333 and the outer circumferential surface of the first yoke 31.

Magnetic Flux Density Distribution of Yoke

In the present embodiment, the second yoke 32 includes the two magnetic members, and the first magnetic member 33 and the second magnetic member 34 are stacked and fixed to the end surface of the magnet 61. In this way, in the second yoke 32, only a portion that has high magnetic flux density and where magnetic saturation is likely to occur can be thickened, and the cylindrical section 333 that surrounds the outer circumferential side of the magnet 61 can be thickened no more than necessary. Therefore, it is possible to improve magnetic efficiency, to suppress an increase in an outer diameter of the movable body 3, and thus to suppress enlargement of the actuator 1.

Figure 6:
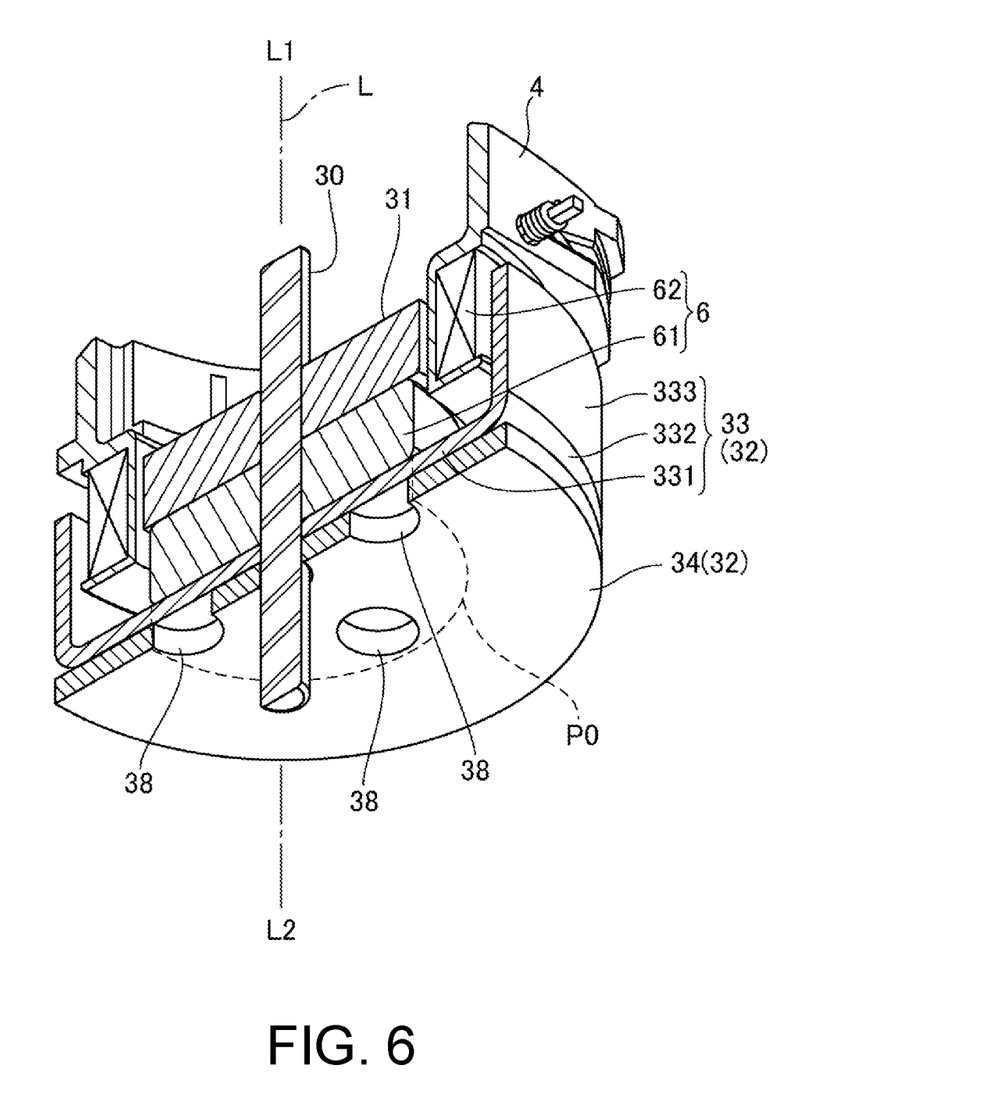
FIG. 6 is a cross-sectional perspective view of a portion constituting a magnetic circuit in the actuator.

FIG. 6 is a cross-sectional perspective view of a portion constituting a magnetic circuit in the actuator 1. The magnetic circuit includes: the first yoke 31 that is fixed to the end surface on the one side L1 of the magnet 61; and the second yoke 32 that is fixed to the end surface on the other side L2 of the magnet 61 and surrounds the outer circumferential side of the coil 62. The coil 62 is arranged in a radial clearance between the first yoke 31 and the second yoke 32.

Figure 7:
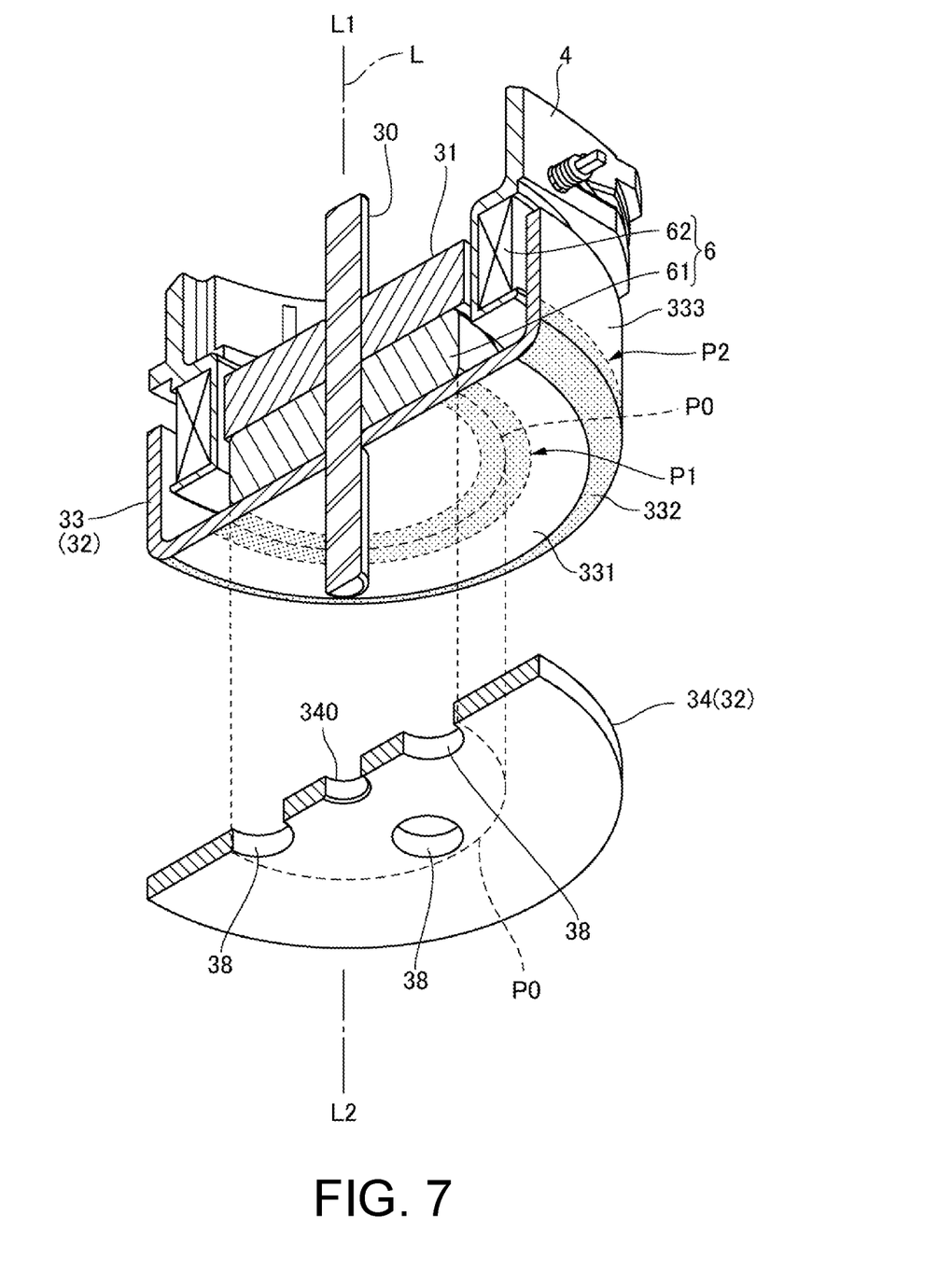
FIG. 7 is an explanatory view illustrating a magnetically saturated portion in a first magnetic member.

FIG. 7 is an explanatory view illustrating a magnetically saturated portion in the first magnetic member 33. In the first magnetic member 33, a first portion P1 and a second portion P2, each of which is indicated by shading in FIG. 7, are magnetically saturated. The first portion P1 is an annular portion that overlaps an outer circumferential edge of the magnet 61 when seen in the axial direction, and is an annular area centered on a center circle P0 that overlaps the outer circumferential edge of the magnet 61 when seen in the axial direction. The second portion P2 is ends on the other side L2 of the bent section 332 and the cylindrical section 333. In the present embodiment, the first magnetic member 33 is manufactured by drawing, and the magnetic flux density of the bent section 332, which connects the end plate 331 and the cylindrical section 333, is high. In addition, the magnetic flux density of a portion of the first magnetic member 33 that overlaps the outer circumferential surface of the magnet 61 when seen in the axial direction is high. The magnetic flux density of the first magnetic member 33 is reduced toward a radially inner side and a radially outer side from the center circle P0. In the vicinity of the bent section 332, the magnetic flux density is increased toward the bent section 332.

As illustrated in FIG. 6, an outer circumferential edge of the second magnetic member 34 extends to a position at which the circumferential edge overlaps the bent section 332 when seen in the axial direction. In the present embodiment, an outer diameter of the second magnetic member 34 and an outer diameter of the cylindrical section 333 have the same dimension, and an outer circumferential end surface of the second magnetic member 34 is located on the same plane as the outer circumferential surface of the cylindrical section 333. Accordingly, the second magnetic member 34 overlaps the entire second portion P2 when seen in the axial direction, and the entire magnetically saturated portion overlaps the outer circumferential end of the second magnetic member 34. Therefore, in the second yoke 32, thickness of the portion with the high magnetic flux density is secured by the outer circumferential end of the second magnetic member 34, and a magnetic path is formed in the portion with the high magnetic flux density by the outer circumferential end of the second magnetic member 34.

Weight Adjustment Section

The second yoke 32 includes a weight adjustment section 38 that adjusts weight of the movable body 3. As described above, the second yoke 32 is constructed of two magnetic members, and one (the second magnetic member 34) of the two magnetic members functions as a weight adjustment member. In the present embodiment, the weight adjustment section 38 is a circular through hole that is provided in the second magnetic member 34. The number and a size of the weight adjustment section 38 are set such that weight of the second magnetic member 34 matches a design value without changing an outer shape of the second magnetic member 34.

In the actuator 1 in which the movable body 3 and the support body 2 are connected by the connection body 10 (the gel-like member), as represented by the following formula (1), a resonance frequency f0 of the movable body 3 is defined by a formula that includes mass m of the movable body 3 and a spring constant k of the connection body 10. A sense of force (strength of vibration) that a user perceives from vibration of the actuator 1 is increased with an increase in the mass m of the movable body 3 and is reduced with a reduction in the mass m of the movable body 3. The mass m of the movable body 3 is determined such that the actuator 1 generates the desired vibration.

$$\text{Resonance frequency } f0 = (1/2\pi) \times \sqrt{(k/m)} \tag{1}$$

k: spring constant of the connection body (the gel-like member), m: mass of the movable body 3

The second magnetic member 34 includes the plural weight adjustment sections 38. In the present embodiment, as illustrated in FIG. 5, the four weight adjustment sections 38 are aligned in the circumferential direction at angular intervals of 90 degrees. The four weight adjustment sections 38 are evenly arranged in the circumferential direction with the center axis L of the movable body 3 being a center. In other words, the four weight adjustment sections 38 are arranged on concentric circles centered on the center axis L and are arranged at equal angular intervals. In the present embodiment, a center of gravity of the movable body 3 is located on the center axis L. Accordingly, the weight adjustment sections 38 are evenly arranged in the circumferential direction with the center of gravity of the movable body 3 being the center. Thus, the center of gravity of the movable body 3 is not shifted by the provision of the weight adjustment section 38.

As illustrated in FIGS. 6 and 7, the weight adjustment section 38 is arranged on the inner circumferential side of the outer circumferential edge of the magnet 61 when seen in the axial direction. The magnetic flux density of the first magnetic member 33 is the highest at a position of the center circle P0, at which the first magnetic member 33 overlaps the outer circumferential edge of the magnet 61 when seen in the axial direction. Thus, the weight adjustment section 38 is arranged on the inner circumferential side of the position, at which the magnetic flux density is the highest, in the end plate 331. The weight adjustment section 38 is a magnetic member deficient portion. Thus, when the weight adjustment section 38 is shifted from the position with the high magnetic flux density, the magnetic member deficient portion is not provided at the position with the high magnetic flux density. Therefore, the magnetic path is formed in the portion with the high magnetic flux density.

Method for Manufacturing Connection Body

Each of the first connection body 11 and the second connection body 12 is made of a viscoelastic body. For example, as each of the first connection body 11 and the second connection body 12, it is possible to employ the gel-like member made of silicone gel or the like, any of various rubber materials such as natural rubber, diene-based rubber (for example, styrene-butadiene rubber, isoprene rubber, butadiene rubber, chloroprene rubber, acrylonitrile butadiene rubber, and the like), non-diene-based rubber (for example, butyl rubber, ethylene-propylene rubber, ethylene-propylene-diene rubber, urethane rubber, silicone rubber, fluororubber, and the like), and thermoplastic elastomers, and a modified material of any of those. In addition, the viscoelastic body that can be used as the connection body 10 may be a composite component in which the gel-like member, the rubber, or the modified material thereof is combined with an elastic body such as a spring.

In this embodiment, the first connection body 11 and the second connection body 12 are each made of a silicone gel having the penetration of 90 to 110. The first connection body 11 and the second connection body 12 are manufactured by a method for filling a mold with the gel material and curing the gel material (casting). When the first connection body 11 is molded, the first outer frame member 51 and the first inner frame member 36 are coaxially positioned by a jig, and an annular clearance is provided between the first outer frame member 51 and the first inner frame member 36. Then, this clearance is filled with the gel material, and the gel material is cured by heating. As a result, due to the viscosity of the gel-like member itself, the first connection body 11 is joined to the inner circumferential surface of the first outer frame member 51 and the outer circumferential surface of the first inner frame member 36.

Prior to filling of the clearance with the gel material, joint strength can be enhanced by applying a joint enhancer such as a primer to the inner circumferential surface of the first outer frame member 51 and the outer circumferential surface of the first inner frame member 36. Similarly, the second connection body 12 is molded by providing the annular clearance between the second outer frame member 52 and the second inner frame member 37, filling this clearance with the gel material, and curing the gel material by heating. Accordingly, when the actuator 1 is assembled, the support body 2 and the movable body 3 can be connected without a process of adhering the gel-like member.

Operation of Actuator

In the actuator 1, the magnetic drive mechanism 6 generates the drive power to drive the movable body 3 in the axial direction by energizing the coil 62. When the coil 62 is deenergized, the movable body 3 returns to an origin position by a return force of the connection body 10. Thus, by intermittently energizing the coil 62, the movable body 3 vibrates in the axis direction. In addition, by adjusting AC waveform that is applied to the coil 62, acceleration at which the movable body 3 moves to the one side L1 in the axial direction can be made to differ from the acceleration at which the movable body 3 moves to the other side L2 in the axial direction. Therefore, the user who holds a device, to which the actuator 1 is attached as a tactile device, can feel a sense of the vibration having directionality in the axial direction. The actuator 1 can also be used to constitute a speaker.

In the present embodiment, the connection body 10 is arranged at a position at which the support body 2 and the movable body 3 oppose each other in a first direction (the radial direction), and the movable body 3 vibrates in a second direction (the axial direction) that is orthogonal to the first direction (the radial direction). When the movable body 3 oscillates in the second direction (the axial direction) with respect to the support body 2, the first connection body 11 and the second connection body 12 are deformed in a shear direction by following the vibration of the movable body 3. The gel-like member, such as the silicone gel, has a linear or non-linear stretch characteristic depending on a stretching direction thereof. When the gel-like member is deformed in the shearing direction, a linear component thereof has a more significant deformation characteristic than a non-linear component thereof. Accordingly, when the movable body 3 vibrates in the axial direction with respect to the support body 2, the first connection body 11 and the second connection body 12 are deformed within a range of high linearity. Thus, it is possible to obtain a vibration characteristic with the favorable linearity.

When the movable body 3 moves in the radial direction, the first connection body 11 and the second connection body 12 are deformed in a collapsing direction. Here, the spring constant in the case where the gel-like member is deformed in the collapsing direction is about three times the spring constant in the case where the gel-like member is deformed in the shearing direction. As a result, it is possible to suppress movement of the movable body 3 in a different direction from the vibration direction (the axial direction) and thus to suppress a collision between the movable body 3 and the support body 2.

Main Effects of Present Embodiment

As it has been described so far, the actuator according to the present embodiment includes the support body 2, the movable body 3, the connection body 10 connected to the support body 2 and the movable body 3, and a magnetic drive mechanism 6 that includes the magnet 61 and the coil 62 and causes the movable body 3 to move relative to the support body 2. The movable body 3 includes: the support shaft 30 having the outer circumferential surface, to which the magnet 61 is fixed; and the second yoke 32 that is fixed to the end surface of the magnet 61 in the axial direction. The second yoke 32 includes: the first magnetic member 33 that includes the end plate 331 fixed to the end surface on the other side L2 of the magnet 61, the bent section 332 provided at the outer edge of the end plate 331, and the cylindrical section 333 extending from the bent section 332 toward the magnet 61 side; and the second magnetic member 34 that is fixed to the opposite side of the end plate 331 from the side of the magnet 61. The second magnetic member 34 includes the weight adjustment section 38 that is provided on the inner circumferential side of the outer circumferential surface of the magnet 61 when seen in the axial direction, and the weight adjustment section 38 is the through hole.

In the present embodiment, the second yoke 32 includes the two magnetic members, and the second magnetic member 34 includes the through hole as the weight adjustment section 38. Accordingly, the weight of the second magnetic member 34 can be changed without changing the outer shape of the second magnetic member 34. Consequently, the magnetic path, which is formed at the position in the bent section 332 of the first magnetic member 33, is less likely to be narrowed. In addition, the magnetic flux density of the first magnetic member 33 is high in the portion that overlaps the outer circumferential surface of the magnet 61 when seen in the axial direction. The weight adjustment section 38 has such a shape to adjust the weight by lacking a portion of the magnetic member on the inner circumferential side of the portion with the high magnetic flux density. Thus, the magnetic path is less likely to be narrowed. Therefore, it is possible to suppress an increase in magnetic resistance, which is caused by the formation of the weight adjustment section 38, and to suppress degradation of the magnetic efficiency, which is caused by the weight adjustment of the movable body 3.

In the present embodiment, since the weight adjustment section 38 is the through hole, the weight adjustment section 38 can easily be formed in the second magnetic member 34. In addition, it is easy to form the through hole or a half-punched section in the plate-shaped second magnetic member 34, and it is also easy to change the number and a size thereof. For this reason, the weight of the second magnetic member 34 can easily be changed, and the weight of the movable body 3 can easily be adjusted. As described above, in the present embodiment, the weight adjustment sections 38 are provided at the four positions. However, the number of the weight adjustment section 38 is not limited to four and may be three, two, five, or more. Here, in the case where the weight adjustment section 38 is provided at the single position, the center of gravity of the movable body 3 is possibly shifted. Thus, the weight adjustment sections 38 are preferably provided at the two or more positions. Furthermore, the shape of the weight adjustment section 38 is not limited to the circular shape and may be a polygonal shape or a long hole shape.

The weight adjustment section 38 does not have to be the through hole and may be the half-punched section. In other words, as long as the weight adjustment section 38 is deficient either partially or entirely in a thickness direction, the weight adjustment section 38 does not have to be the through hole with which the entire portion in the thickness direction is deficient, and may be the half-punched section with which the portion in the thickness direction is partially deficient. By providing the through hole or the half-punched portion as the weight adjustment section 38, the weight of the second magnetic member 34 can be reduced without changing the outer shape of the second magnetic member 34.

In the present embodiment, the weight adjustment sections 38 are evenly arranged in the circumferential direction with the center of gravity of the movable body 3 being the center. Therefore, it is possible to prevent shifting of the center of gravity of the movable body 3, which is caused by the provision of the weight adjustment section 38.

In the present embodiment, when seen in the axial direction, the outer circumferential end of the second magnetic member 34 extends to the position at which the outer circumferential end overlaps the bent section 332 of the first magnetic member 33. In the first magnetic member 33, the bent section 332 has the high magnetic flux density. Thus, as long as the outer circumferential end of the second magnetic member 34 reaches the bent section 332, it is possible to avoid the magnetic path from being narrowed. As a result, it is possible to suppress the increase in the magnetic resistance and to suppress the degradation of the magnetic efficiency, which is caused by the weight adjustment of the movable body 3.

In the present embodiment, the outer circumferential end surface of the second magnetic member 34 extends to the same position as the outer circumferential surface of the cylindrical section 333 when seen in the axial direction. For this reason, an entire range of the bent section 332 overlaps the second magnetic member 34 when seen in the axial direction. Thus, it is possible to secure the magnetic path. Therefore, it is possible to suppress the increase in the magnetic resistance and to suppress the degradation of the magnetic efficiency, which is caused by the weight adjustment of the movable body 3. Here, such a configuration may be adopted that the outer circumferential end surface of the second magnetic member 34 is located on a more outer circumferential side than the outer circumferential surface of the cylindrical section 333.

The invention claimed is:

1. An actuator comprising:
   a support body and a movable body;
   a connection body connected to the support body and the movable body; and
   a magnetic drive mechanism that includes a magnet and a coil and causes the movable body to move relative to the support body, wherein
   the movable body includes: a support shaft having an outer circumferential surface, to which the magnet is fixed; and a yoke that is fixed to an end surface of the magnet in an axial direction,
   the yoke includes:
      a first magnetic member that includes an end plate fixed to the end surface, a bent section provided at an outer edge of the end plate, and a cylindrical section extending from the bent section to the magnet side; and
      a second magnetic member that is fixed to an opposite side of the end plate from the side of the magnet,
   the second magnetic member includes a weight adjustment section, which is deficient either partially or entirely in a thickness direction, and
   when seen in the axial direction, the weight adjustment section is provided on an inner circumferential side of an outer circumferential surface of the magnet.
2. The actuator according to claim 1, wherein
   the weight adjustment section is a through hole or a half-punched section.
3. The actuator according to claim 1, wherein
   the weight adjustment section includes a plurality of weight adjustment sections arranged evenly in a circumferential direction with a center of gravity of the movable body being a center.
4. The actuator according to claim 1, wherein
   when seen in the axial direction, an outer circumferential end of the second magnetic member extends to a position at which the outer circumferential end overlaps the bent section.
5. The actuator according to claim 4, wherein
   when seen in the axial direction, an outer circumferential end surface of the second magnetic member is located at the same position as an outer circumferential surface of the cylindrical section or on a more outer circumferential side than the outer circumferential surface of the cylindrical section.

* * * * *